United States Patent
Majumder

(10) Patent No.: US 10,879,703 B2
(45) Date of Patent: Dec. 29, 2020

(54) SYNCHRONIZATION OF MICROGRIDS WITH EACH OTHER

(71) Applicant: ABB Power Grids Switzerland AG, Baden (CH)

(72) Inventor: Ritwik Majumder, Västerås (SE)

(73) Assignee: ABB POWER GRIDS SWITZERLAND AG, Baden (CH)

( * ) Notice: Subject to any disclaimer, the term of this patent is extended or adjusted under 35 U.S.C. 154(b) by 0 days.

(21) Appl. No.: 16/461,893

(22) PCT Filed: Nov. 18, 2016

(86) PCT No.: PCT/EP2016/078097
§ 371 (c)(1),
(2) Date: May 17, 2019

(87) PCT Pub. No.: WO2018/091102
PCT Pub. Date: May 24, 2018

(65) Prior Publication Data
US 2019/0334351 A1    Oct. 31, 2019

(51) Int. Cl.
*H02J 3/42*    (2006.01)
*G05B 9/02*    (2006.01)

(52) U.S. Cl.
CPC .  *H02J 3/42* (2013.01); *G05B 9/02* (2013.01)

(58) Field of Classification Search
CPC .................................. H02J 3/42; G05B 9/02
(Continued)

(56) References Cited

U.S. PATENT DOCUMENTS

| 7,521,825 B2 | 4/2009 | Lasseter et al. | |
| 2011/0215652 A1* | 9/2011 | Gengenbach | H02J 3/18 307/87 |

(Continued)

FOREIGN PATENT DOCUMENTS

| CN | 104836334 A | 8/2015 |
| CN | 104917199 A | 9/2015 |

(Continued)

OTHER PUBLICATIONS

Nutkani, IU et al. Distributed Operation of Interlinked AC Microgrids with Dynamic Active and Reactive Power Tuning. IEEE Transactions on Industry Applications, vol. 49, No. 5, pp. 2188-2196, Sep.-Oct. 2013, [online], [retrieved on Jun. 10, 2020]. Retrieved from the Internet. (Year: 2013).*

(Continued)

*Primary Examiner* — Kenneth M Lo
*Assistant Examiner* — Mohammed Shafayet
(74) *Attorney, Agent, or Firm* — Slater Matsil, LLP

(57) ABSTRACT

A method for synchronization of first and second microgrids, having respective first and second voltages and frequencies. The method includes determining a possible voltage and frequency range, determining an overlapping voltage range, determining an overlapping frequency range, selecting a third voltage within the overlapping voltage range. The method also includes selecting a third frequency within the overlapping frequency range. The method also includes controlling the first microgrid to change from the first voltage and frequency to the third voltage and frequency. The method also includes controlling the second microgrid to change from the second voltage and frequency to the third voltage and frequency. The method also includes connecting the first and second microgrids to each other by closing a switch there between.

20 Claims, 7 Drawing Sheets

(58) Field of Classification Search
USPC .......................................................... 700/292
See application file for complete search history.

(56) References Cited

U.S. PATENT DOCUMENTS

| | | | | |
|---|---|---|---|---|
| 2011/0248569 A1* | 10/2011 | Son | ........................ | H02J 3/381 307/87 |
| 2013/0073109 A1* | 3/2013 | Cheng | ...................... | H02J 3/40 700/298 |
| 2014/0200722 A1* | 7/2014 | Bhavaraju | ............... | H02J 3/381 700/286 |
| 2014/0249686 A1* | 9/2014 | Brainard | ................... | H02J 3/08 700/286 |
| 2015/0295581 A1* | 10/2015 | Shi | ........................... | H02J 3/40 700/287 |
| 2016/0179116 A1* | 6/2016 | Bacque | ..................... | H02J 3/18 700/298 |
| 2016/0266559 A1* | 9/2016 | Shi | ........................... | H02J 3/40 |
| 2017/0018932 A1* | 1/2017 | Pahlevaninezhad | .... | H02J 3/381 |
| 2017/0229870 A1* | 8/2017 | Singh | ........................ | H02J 3/32 |
| 2018/0054055 A1* | 2/2018 | Majumder | ................ | H02J 3/32 |

FOREIGN PATENT DOCUMENTS

| | | |
|---|---|---|
| DE | 102010001333 A1 | 8/2011 |
| WO | 2012073228 A1 | 6/2012 |
| WO | 2013015773 A1 | 1/2013 |
| WO | 2014071314 A2 | 5/2014 |
| WO | 2016023574 A1 | 2/2016 |

OTHER PUBLICATIONS

Chinese Office Action and Translation Application No. 2016800907016 Completed: Jul. 24, 2019 3 pages.
International Search Report and Written Opinion of the International Searching Authority Application No. PCT/EP2016/078097 Completed: Jul. 14, 2017; dated Jul. 21, 2017 13 pages.

* cited by examiner

SYNCHRONIZATION OF MICROGRIDS WITH EACH OTHER

TECHNICAL FIELD

The present disclosure relates to a method for synchronization of a first microgrid and a second microgrid with each other.

BACKGROUND

A microgrid is a localized grouping of electricity generation, energy storage, and loads that normally operates connected to a traditional centralized grid (macrogrid e.g., a power distribution grid) via a PCC (Point of Common Coupling). This single point of common coupling with the macrogrid can be disconnected, islanding the microgrid. Microgrids are part of a structure aiming at producing electrical power locally from many small energy sources, distributed generators (DGs). In a microgrid, a DG is connected via a converter which controls the output of the DG, i.e., the current injected into the microgrid.

A microgrid (in grid connected mode, i.e., connected to the macrogrid) supplies the optimized or maximum power outputs from the connected DG sites and the rest of the power is supplied by the macrogrid, or excess power of the microgrid is injected into the macrogrid. The microgrid is connected to the macrogrid at a PCC through a controllable switch. This grid connection is lost during grid fault and the microgrid is islanded. Similarly, a microgrid may be connected to, or islanded from, another microgrid.

In an AC microgrid, the frequency is the same everywhere in steady state while voltage may differ depending on the power flow. However, in a microgrid with a continuous change in DG output, load switching and low inertia, there is continuous frequency and voltage fluctuation on a small scale. The deviations are larger during large transients (i.e., DG fault etc.). In islanded mode, a microgrid may operate in a different frequency and voltage, compared to main grid frequency and voltage. During resynchronization, microgrid frequency is matched to the main grid frequency. Similar matching is also done for voltage magnitude between the microgrid and main grid. Before reconnection of the microgrid after islanding, resynchronization with voltage magnitude, phase angle and frequency matching is performed to ensure stability of the microgrid at reconnection. Once the voltage and frequency matching is achieved the breaker is closed at the instant of phase match. This is done to minimize the transient.

SUMMARY

It has now been realized that resynchronization of two islanded microgrids presents an opportunity to adjust system parameters (voltage and frequency) for each and both of the microgrids. This may e.g., be used in a nested microgrids scenario or for a collection of remote, typically small, microgrids grids in rural electrification.

The resynchronization of two islanded microgrids operating at different voltage and frequency, as measured at (but on either side of) an open switch between the two microgrids, is in accordance with the present invention done at a third voltage and frequency which is selected based on properties and requirements of the two microgrids.

Advantages may include enhanced stability, quicker attainment of steady state, better power flow management at tie line and improved power quality within each microgrid during the resynchronization process.

According to an aspect of the present invention, there is provided a method for synchronization of a first microgrid, having a first voltage and a first frequency, and a second microgrid, having a second voltage and a second frequency, with each other. The method comprises for each of the first and second microgrids: determining a possible voltage range, and determining a possible frequency range, e.g., by calculating said possible voltage and frequency ranges or by receiving information about said possible voltage and frequency ranges. The method also comprises determining an overlapping voltage range comprised within both the possible voltage range of the first microgrid and the possible voltage range of the second microgrid. The method also comprises determining an overlapping frequency range comprised within both the possible frequency range of the first microgrid and the possible frequency range of the second microgrid. The method also comprises selecting a third voltage within the overlapping voltage range. The method also comprises selecting a third frequency within the overlapping frequency range. The method also comprises controlling the first microgrid to change from the first voltage and frequency to the third voltage and frequency. The method also comprises controlling the second microgrid to change from the second voltage and frequency to the third voltage and frequency. The method also comprises connecting the first and second microgrids to each other by closing a switch there between, e.g., by sending a control signal to said switch.

According to another aspect of the present invention, there is provided a computer program product comprising computer-executable components for causing a microgrid network controller to perform an embodiment of the method of the present disclosure when the computer-executable components are run on processing circuitry comprised in the microgrid network controller.

According to another aspect of the present invention, there is provided a microgrid network controller configured for synchronization of a first microgrid, having a first voltage and a first frequency, and a second microgrid, having a second voltage and a second frequency, with each other. The microgrid network controller comprises processing circuitry, and storage storing instructions executable by said processing circuitry whereby said microgrid network controller is operative to for each of the first and second microgrids: determine a possible voltage range, and determine a possible frequency range, e.g., by calculating said possible voltage and frequency ranges or by receiving information about said possible voltage and frequency ranges. The microgrid network controller is also operative to determine an overlapping voltage range comprised within both the possible voltage range of the first microgrid and the possible voltage range of the second microgrid. The microgrid network controller is also operative to determine an overlapping frequency range comprised within both the possible frequency range of the first microgrid and the possible frequency range of the second microgrid. The microgrid network controller is also operative to select a third voltage within the overlapping voltage range. The microgrid network controller is also operative to select a third frequency within the overlapping frequency range. The microgrid network controller is also operative to control the first microgrid to change from the first voltage and frequency to the third voltage and frequency. The microgrid network controller is also operative to control the second microgrid to change from the second voltage and frequency to the third voltage and frequency. The microgrid network controller is also operative to connect the first and second microgrids to each other by closing a switch there between, e.g., by sending a control signal to said switch.

By determining the overlapping voltage and frequency ranges of the at least two microgrids and then changing the voltage and frequency of both microgrids to the selected third voltage and frequency, typically different from both the first and second voltages and frequencies, the synchronization voltage and frequency (i.e., the third voltage and frequency) may be more optimal for the operation of both microgrids, compared with changing the voltage and frequency of only one of the microgrids.

As discussed above, the frequency of a microgrid is typically the same in the whole microgrid, while the voltage may vary in different parts of the microgrid. Thus, when the frequency and (especially) the voltage of a microgrid is discussed herein, the frequency and voltage at the PCC with the other microgrid with which it is to be synchronized and connected is intended. The PCC is typically at a switch which is closed to connect the microgrids to each other.

It is to be noted that any feature of any of the aspects may be applied to any other aspect, wherever appropriate. Likewise, any advantage of any of the aspects may apply to any of the other aspects. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc.", are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc., for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Figure 1A:
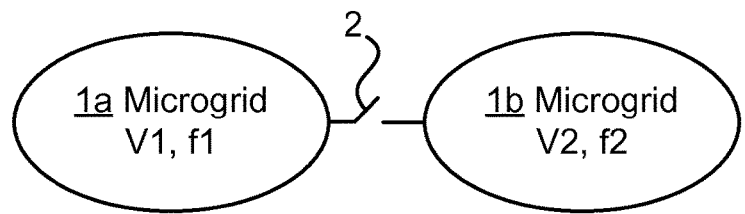
FIG. 1a is a schematic illustration of an embodiment of a microgrid system comprising a first and a second microgrid, in accordance with the present invention.
Figure 1B:
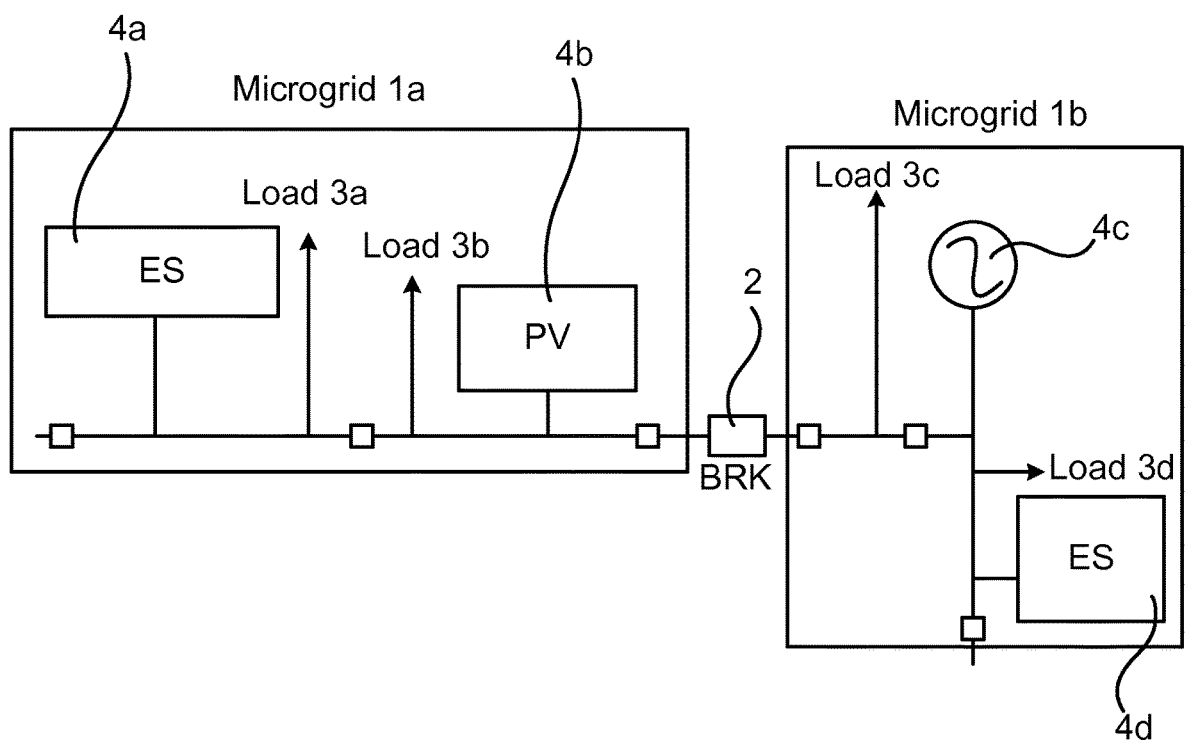
FIG. 1b is a more detailed schematic circuit diagram of an embodiment of a microgrid system comprising a first and a second microgrid, in accordance with the present invention.

FIGS. 1a and 1b illustrate two islanded microgrids, a first microgrid 1a and a second microgrid 1b, operating at different voltages and frequencies (V1, f1) and (V2, f2), respectively, e.g., as measured at either side of the open switch 2 between the microgrids. Connection of the microgrids to each other by closing the switch 2 is in accordance with the present invention done at a third voltage and frequency (V3, f3). Each of the microgrids 1a and 1b provides the controllable ranges of voltage and frequency at PCC (switch) 2 with available assets such as DGs 4 and loads 3 as shown in FIG. 1b.

FIG. 1b shows some examples of DGs 4 and loads 3 which may be included in any of the microgrids 1. DGs may e.g., include an energy storage (ES) 4a or 4d, e.g., a battery, supercapacitor or flywheel, a renewable energy source 4b such as a photovoltaic (PV) or wind power generator, and/or an Alternating Current (AC) power generator 4c.

Figure 2:
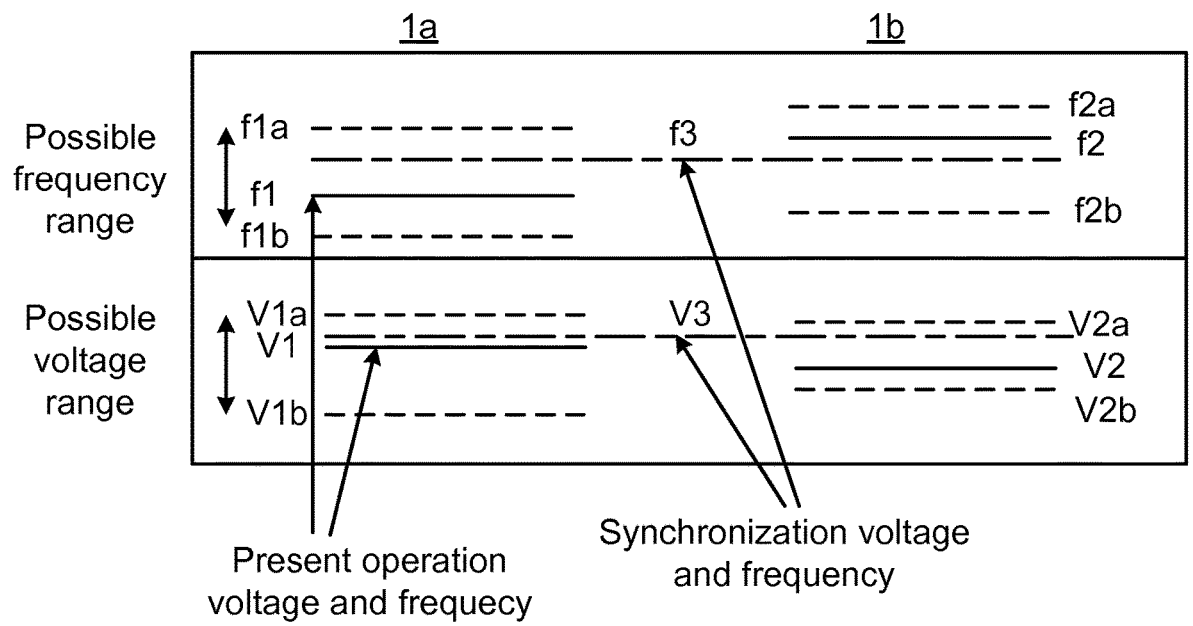
FIG. 2 is a voltage and frequency diagram illustrating an embodiment of selection of a voltage and a frequency for resynchronization of two microgrids, in accordance with the present invention.

As illustrated in FIG. 2, a new third voltage and frequency (V3, f3) is selected for (re)synchronization within the overlapping possible ranges. The possible frequency range of the first microgrid 1a is between f1a and f1b, the possible frequency range of the second microgrid 1b is between f2a and f2b, the possible voltage range of the first microgrid 1a is between V1a and V1b, and the possible voltage range of the second microgrid 1b is between V2a and V2b. The possible ranges are dependent on the assets (such as DGs 4 and loads 3) of the respective microgrid 1, and represents the voltages and frequencies which the microgrids may achieve depending on how they are operated. The two microgrids are then each controlled to achieve the new selected voltage and frequency (V3, f3). Once both the microgrids have achieved that, the switch, e.g., a circuit breaker (BRK), 2 is closed, typically at the instant of phase match. It is assumed that due to error in measurement and control, the frequency in the two microgrids may not be exactly identical to have phasor rotations. A small control error may be allowed to accelerate the synchronization process.

The first, second and third voltages V1, V2 and V3 are typically all different from each other. Similarly, the first, second and third frequencies f1, f2, and f3 are typically all different from each other. However, in some cases, the first and second voltages V1 & V2 may be the same and/or the first and second frequencies f1 & f2 may be the same.

The selection of the (re)synchronization (third) voltage V3 and frequency f3 within the overlapping possible ranges of the first and second microgrids 1a and 1b may be based on e.g.:

1. Requirements of critical loads 3 in the microgrids 1: This may relate to ensuring the power quality a critical load requires.
2. Common microgrid operating voltage/frequency when resynchronized: This may indicate a preference where the resynchronization voltage and frequency is selected based on anticipated voltage/frequency of the common system after resynchronization, e.g., after any load shedding etc., effected in response to islanding have been reversed.
3. Steady state power flow within the microgrids and power flow over the switch/PCC 2: This may ensure non-reversal of power flow during and after resynchronization, e.g., after any load shedding etc., effected in response to islanding have been reversed.
4. Stability: This may relate to microgrid stability and ensure the resynchronizing voltage V3 and/or frequency f3 to avoid system stability issues with the microgrid control.

Thus, the third voltage and frequency may be selected within acceptable voltage and frequency ranges, within the possible ranges, with regard to properties of the first and second microgrids such as those listed above and in table 1 below.

TABLE 1

Microgrid properties for determining acceptable ranges.

| Property | Description | Determining acceptable range |
| --- | --- | --- |
| Critical Load | The frequency bandwidth for the load is considered as the acceptable frequency changes at the load connection in the microgrid. | The acceptable frequency is determined to be above the frequency for load shedding and within load requirement range. |
| Common Frequency/voltage | Based on the energy management of the microgrids when connected, the DGs and loads are considered to calculate the operating frequency, which may then be used as the third frequency. | A load flow study of the common network of the connected microgrids. |
| Steady-state power flow | PCC power flow at steady state is considered so that power reversal does not happen. Third frequency close to steady state frequency so that the power flow when connecting is in the same direction as steady state power flow. | Tie line (PCC) power flow limits are used to define the frequency of the common network of the connected microgrids. |
| Stability | Stability of the control loops dictates the possible frequency ranges microgrids can be operated in before being connected, as well as the system stability during connection. | The frequency or voltage ranges are limited and calculated by the control ranges of the controllers employed for the voltage and frequency control. |

Figure 3:
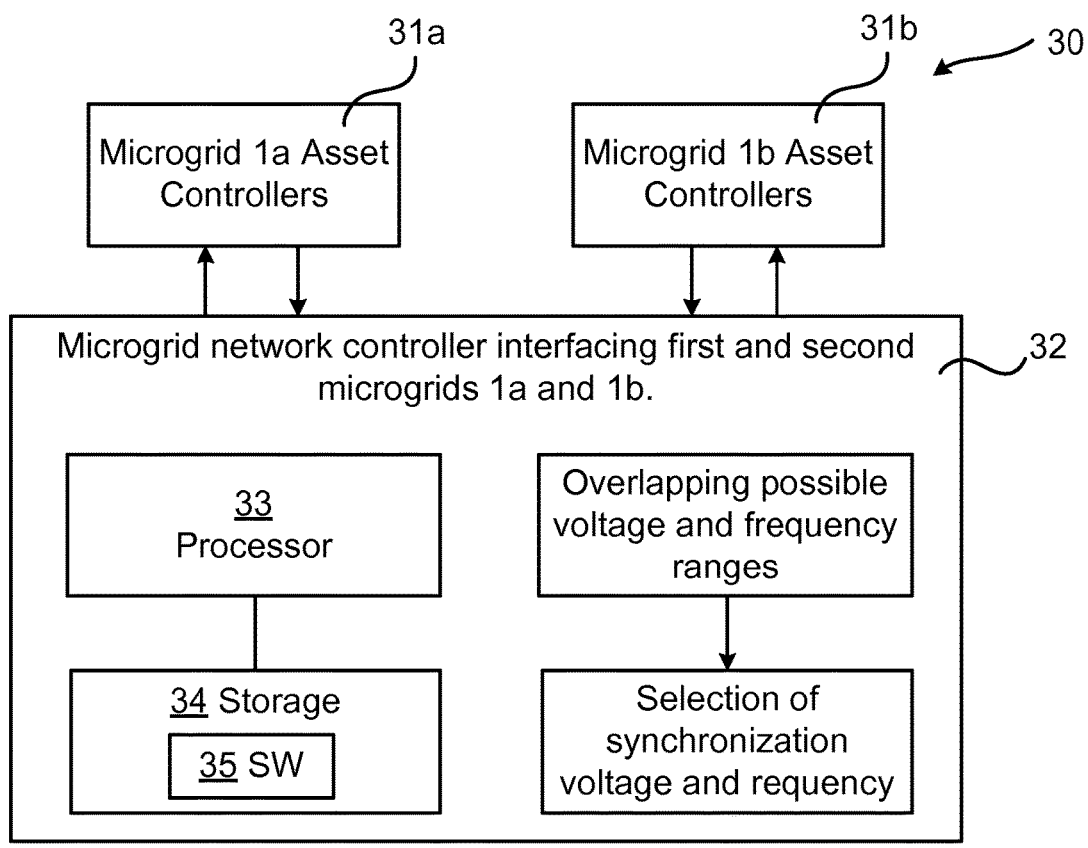
FIG. 3 is a schematic flow chart illustrating embodiments of the microgrid control structure, in accordance with the present invention.

FIG. 3 illustrates an embodiment of a control topology of the control system 30 of the microgrids 1. The control system comprises the microgrid network controller 32, which interfaces both the first and the second microgrid 1a and 1b, as well as asset controllers 31a of assets (e.g., DGs 4 and loads 3) of the first microgrid 1a and assets controllers 31b of assets of the second microgrid 1b. The assets controllers 31 of each microgrid 1 provides the possible voltage and frequency ranges for each asset. Based on the microgrid properties described above, the microgrid network controller 32 selects the resynchronization (third) voltage and frequency. The microgrid assets may then be controlled to achieve said third voltage and frequency for (re)synchronization.

The microgrid network controller 32 comprises processing circuitry 33 e.g., a central processing unit (CPU). The processing circuitry 33 may comprise one or a plurality of processing units in the form of microprocessor(s). However, other suitable devices with computing capabilities could be comprised in the processing circuitry 33, e.g., an application specific integrated circuit (ASIC), a field programmable gate array (FPGA) or a complex programmable logic device (CPLD). The processing circuitry 33 is configured to run one or several computer program(s) or software (SW) 35 stored in a storage 34 of one or several storage unit(s) e.g., a memory. The storage unit is regarded as a computer readable means as discussed herein and may e.g., be in the form of a Random Access Memory (RAM), a Flash memory or other solid state memory, or a hard disk, or be a combination thereof. The processing circuitry 33 may also be configured to store data in the storage 34, as needed.

Embodiments of the present invention may be conveniently implemented in the microgrid network controller 32 using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product, e.g., the storage 34 or an external device, which is a non-transitory storage medium or computer readable medium (media) having instructions stored thereon/in which can be used to program a computer to perform any of the methods/processes of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Figure 4:
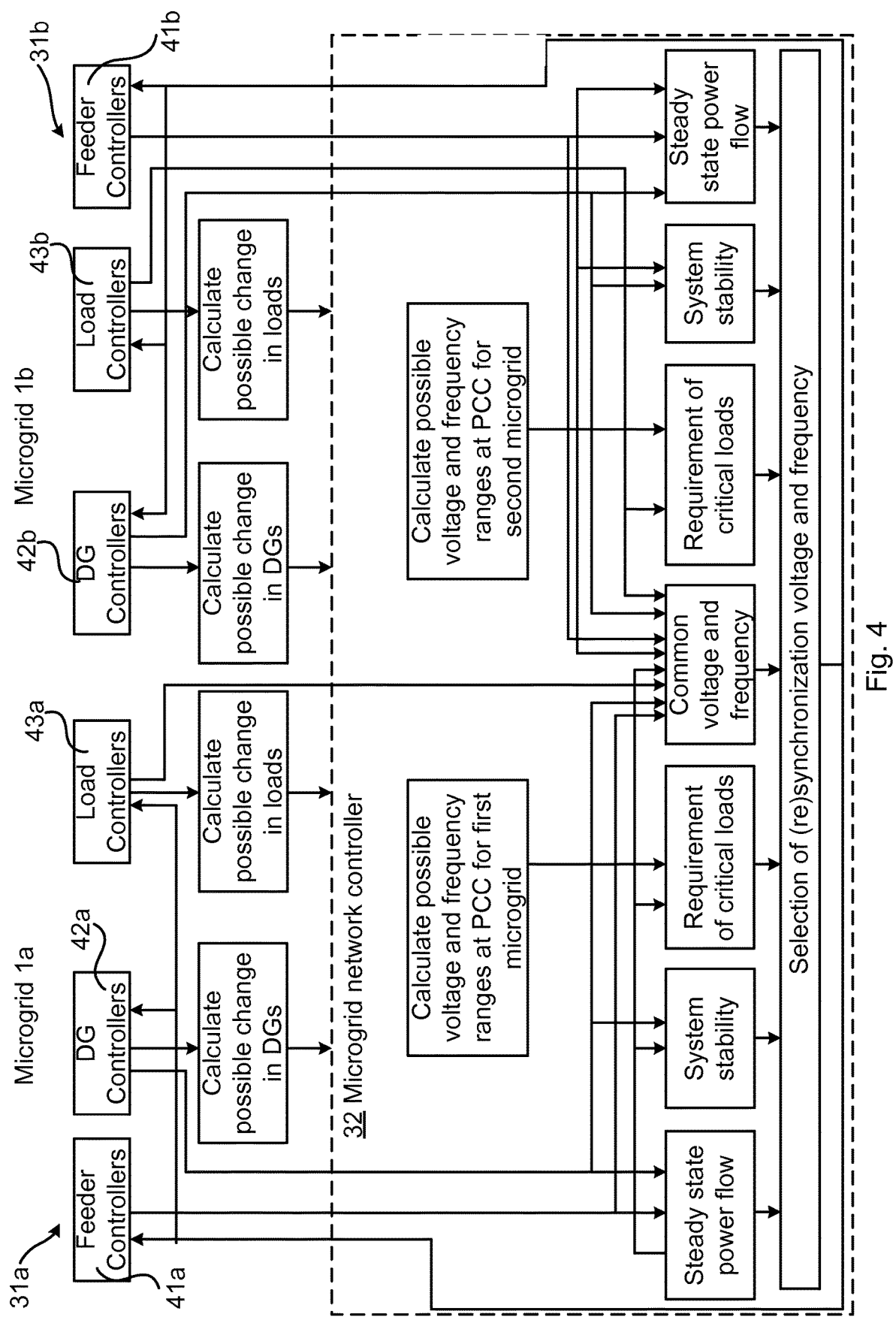
FIG. 4 is a more detailed schematic flow chart illustrating example embodiments of the microgrid control structure, in accordance with the present invention.

FIG. 4 illustrates the example control topology of the control system 30 in more detail. The asset controllers 31 of each of the first and second microgrid 1a and 1b comprise DG controllers 42a and load controllers 43a of the first microgrid 1a, and DG controllers 42b and load controllers 43b of the second microgrid 1b, as well as feeder controllers 41a and 41b, respectively, for each microgrid, for controlling said microgrid and bring it to the selected third voltage and frequency.

The microgrid network controller 32 receives information about the possible changes in DGs 4 and loads 3 in each microgrid 1a and 1b, allowing the microgrid network controller to calculate the possible voltage and frequency ranges of each of the first and second microgrids. The microgrid network controller 32 considers any of the microgrid properties e.g., steady-state power flow, system stability, requirements of critical load(s), and/or common voltage and frequency, as discussed above, to determine the overlapping acceptable voltage and frequency ranges. The third voltage and frequency is then selected within said overlapping acceptable voltage and frequency ranges and used as operating voltage and frequency for synchronization of the microgrids. The microgrid network controller instructs the asset controllers 31 accordingly such that the microgrids are controlled and synchronized.

Figure 5:
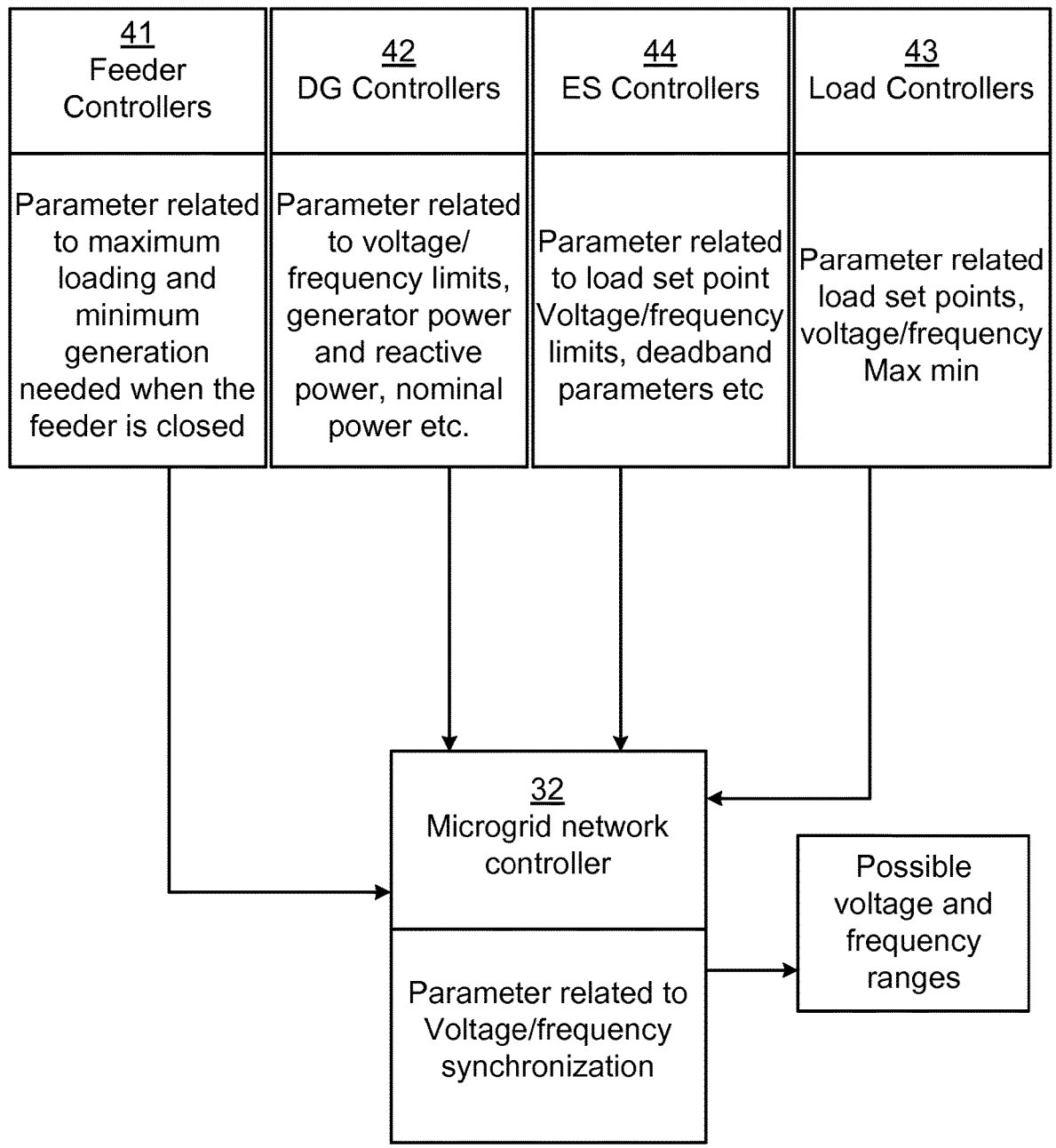
FIG. 5 schematically illustrates embodiments of microgrid control activity for determining possible voltage and frequency ranges, in accordance with the present invention.
Figure 6:
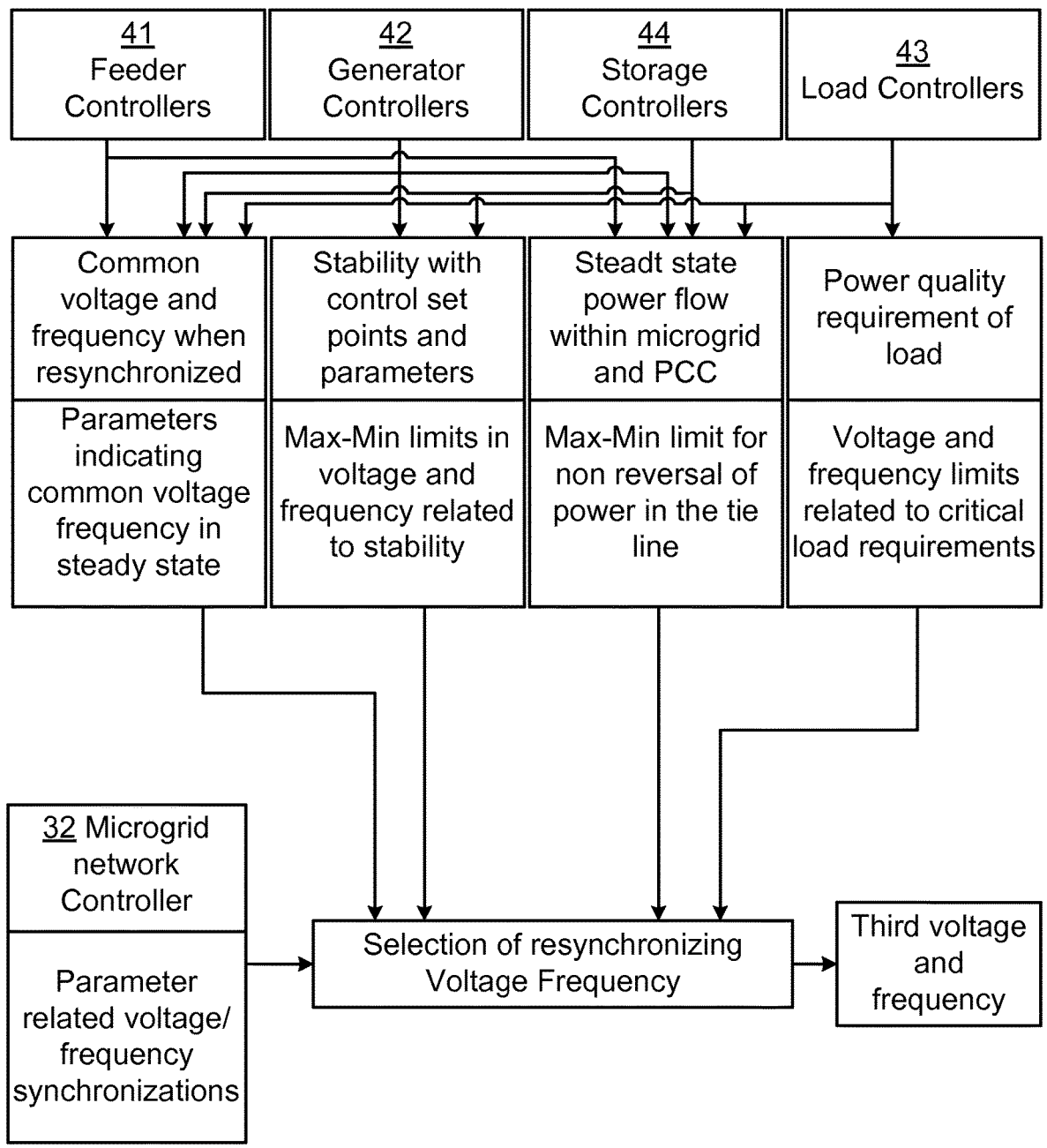
FIG. 6 schematically illustrates embodiments of microgrid control activity for selecting resynchronization voltage and frequency from the possible voltage and frequency ranges, in accordance with the present invention.

Some of the relevant parameter exchanged between the controllers 32 and 41-44 (also including a special ES controller 44) in the control system 30 is shown in FIG. 5 for calculating the possible voltage and frequency ranges. The participation of the controllers to scrutinize the control functions and determining the limits on voltage and frequency are shown in FIG. 6.

Figure 7:
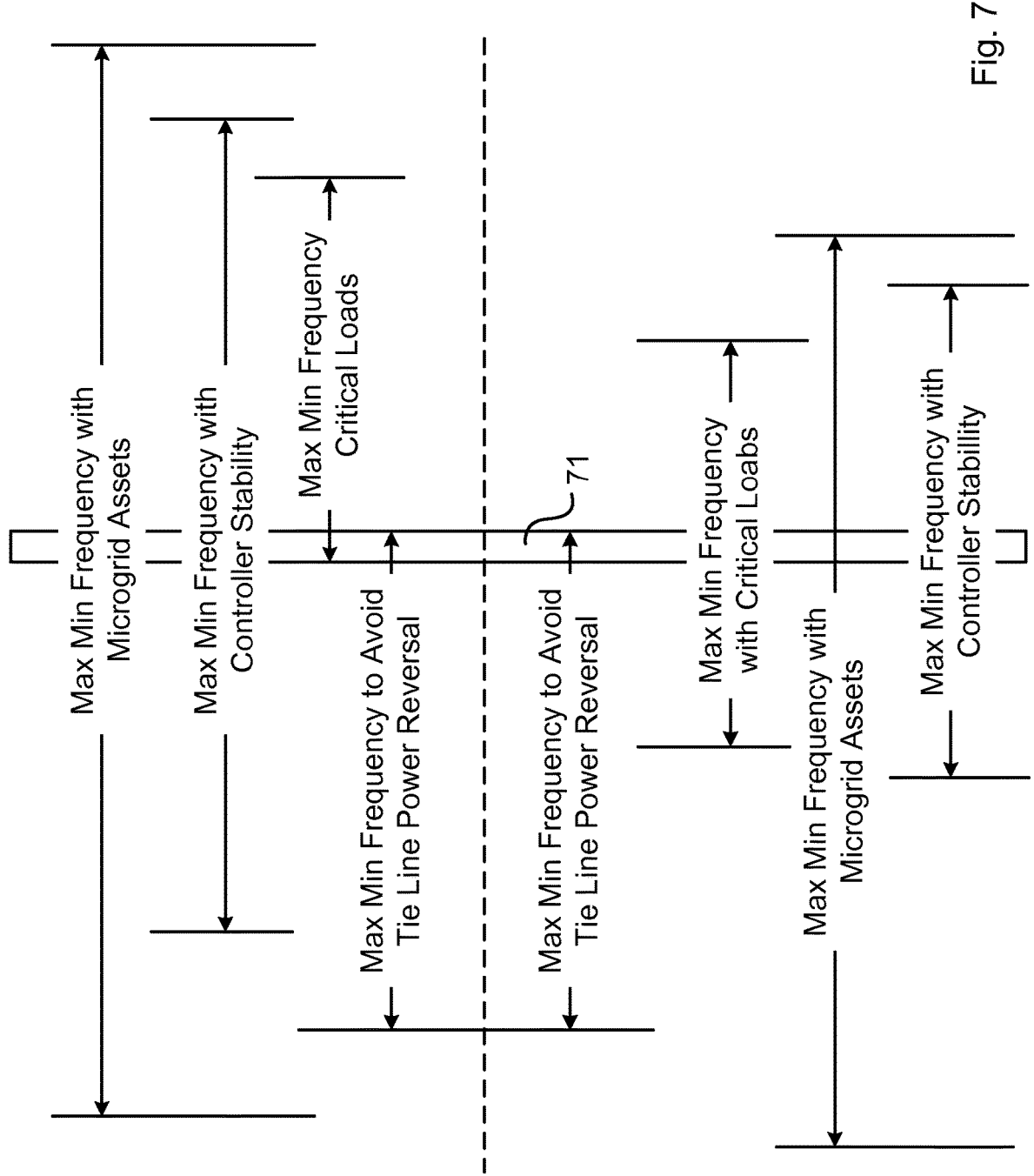
FIG. 7 schematically illustrates examples of the determining of possible voltage and frequency ranges and the selecting of resynchronization voltage and frequency, in accordance with the present invention.

The selection of the third frequency within the overlapping acceptable frequency range 71 from all the property limits from both microgrids by the microgrid network controller 32 is illustrated in FIG. 7. The selection of the third voltage within an overlapping acceptable voltage range from all the property limits from both microgrids may be done correspondingly.

Figure 8:
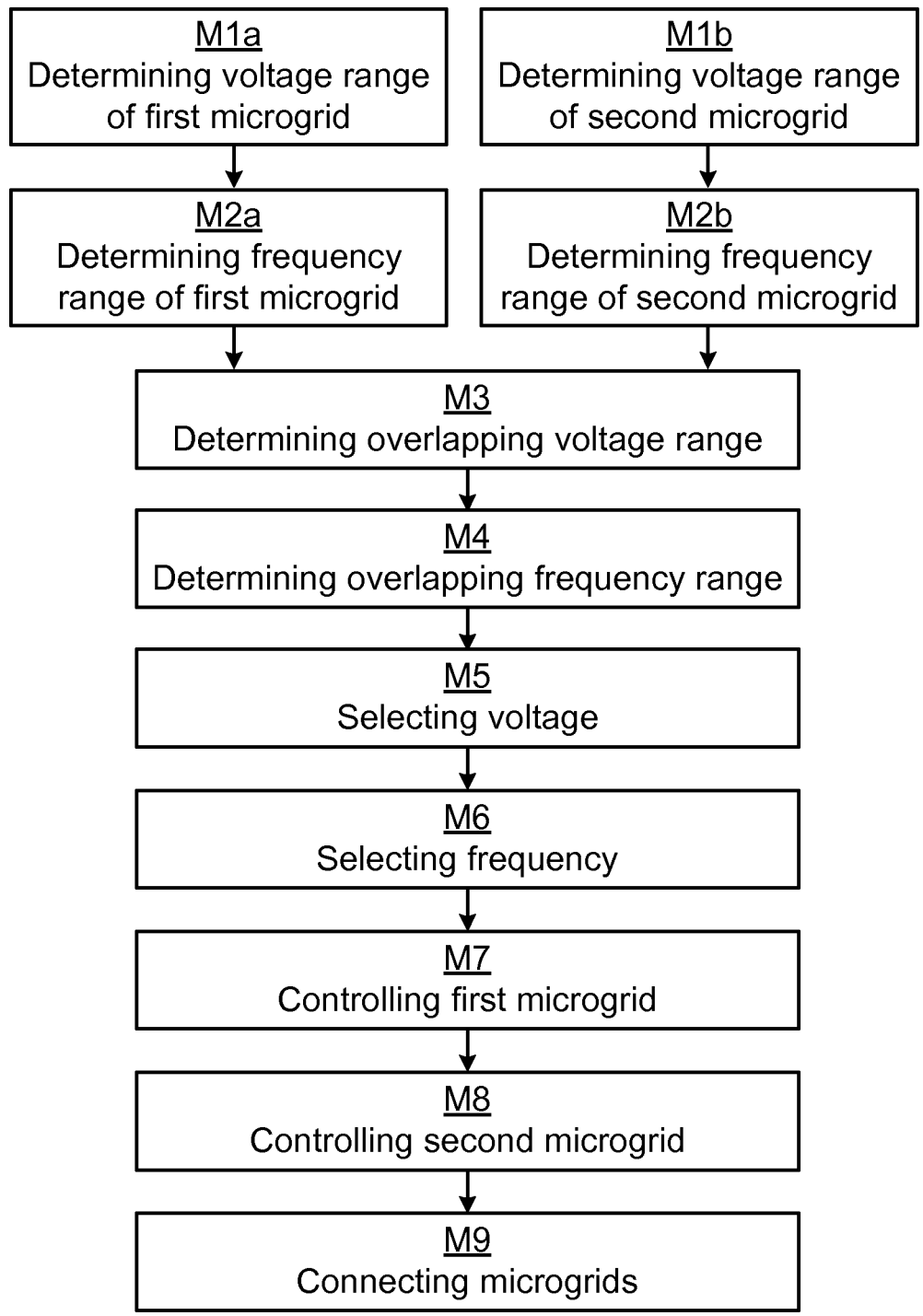
FIG. 8 is a schematic flow chart of an embodiment of the method of the present invention.

FIG. 8 is a schematic flow chart of an embodiment of the method of the present invention. The method is for synchronization of a first microgrid 1a, having a first voltage V1 and a first frequency f1, and a second microgrid 1b, having a second voltage V2 and a second frequency f2, with each other. The method comprises, for each of the first and second microgrids: determining M1a and M1b, respectively, a possible voltage range, and determining M2a and M2b, respectively, a possible frequency range.

Then, an overlapping voltage range comprised within both the possible voltage range of the first microgrid 1a and the possible voltage range of the second microgrid 1b is determined M3, and an overlapping frequency range comprised within both the possible frequency range of the first microgrid 1a and the possible frequency range of the second microgrid 1b is determined M4. Within the overlapping voltage range, a third voltage V3 is selected M5, and within the overlapping frequency range, a third frequency f3 is selected M6.

Then, the first microgrid 1a is controlled M7 to change from the first voltage V1 and frequency f1 to the third voltage V3 and frequency f3, and the second microgrid 1b is controlled M8 to change from the second voltage V2 and frequency f2 to the third voltage V3 and frequency f3.

When both the first and the second microgrids are operating substantially at the third voltage and frequency, the first and second microgrids are connected M9 to each other by closing the switch 2 between the first and second microgrids.

In some embodiments of the present invention, the determining M1a and M1b, respectively, of a possible voltage range, and/or the determining M2a and M2b, respectively, of a possible frequency range is based on the loads 3 and power generators 4 available in said each microgrid 1a and 1b.

In some embodiments of the present invention, the determining M3 of an overlapping voltage range and/or the determining M4 of an overlapping frequency range is based on any of:

power requirements of critical loads 3 in the first and/or second microgrid;

estimated operating voltage and/or frequency of the connected microgrids after the switch 2 has been closed;

estimated steady-state power flow direction over the switch 2 of the connected microgrids; and/or stability of control loops within the control system 30 of the microgrids.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A method for operating a microgrid network comprising a first microgrid and a second microgrid, the method comprising:
   synchronizing the first microgrid operating at a first voltage and a first frequency with the second microgrid operating at a second voltage and a second frequency by
   determining a first voltage range and a first frequency range for operating the first microgrid;
   determining a second voltage range and a second frequency range for operating the second microgrid;
   determining an overlapping voltage range included within both the first voltage range of the first microgrid and the second voltage range of the second microgrid;
   determining an overlapping frequency range included within both the first frequency range of the first microgrid and the second frequency range of the second microgrid;
   selecting a third voltage within the overlapping voltage range;
   selecting a third frequency within the overlapping frequency range;
   controlling the first microgrid to change from the first voltage and the first frequency to the third voltage and the third frequency;
   controlling the second microgrid to change from the second voltage and the second frequency to the third voltage and the third frequency; and
   connecting the first microgrid with the second microgrid by closing a switch connecting the first microgrid to the second microgrid.

2. The method of claim 1, wherein the first voltage range and the first frequency range are determined based on loads and power generators available in the first microgrid, and wherein the second voltage range and the second frequency range are determined based on the loads and power generators available in the second microgrid.

3. The method of claim 1, wherein the determining of the overlapping voltage range is based on power requirements of critical loads in the first microgrid and/or the second microgrid.

4. The method of claim 1, wherein the determining of the overlapping voltage range is based on an estimated operating voltage of the first microgrid and the second microgrid after the switch has been closed and the first microgrid is connected to the second microgrid.

5. The method of claim 1, wherein the determining of the overlapping voltage range is based on an estimated steady-state power flow direction over the switch after the switch has been closed and the first microgrid is connected to the second microgrid.

6. The method of claim 1, wherein the determining of the overlapping voltage range is based on stability of control loops within a control system of the microgrid network.

7. The method of claim 1, wherein the determining of the overlapping frequency range is based on power requirements of critical loads in the first microgrid and/or the second microgrid.

8. The method of claim 1, wherein the determining of the overlapping frequency range is based on an estimated operating frequency of the first microgrid and the second microgrid after the switch has been closed and the first microgrid is connected to the second microgrid.

9. The method of claim 1, wherein the determining of the overlapping frequency range is based on an estimated steady-state power flow direction over the switch after the switch has been closed and the first microgrid is connected to the second microgrid.

10. The method of claim 1, wherein the determining of the overlapping frequency range is based on stability of control loops within a control system of the microgrid network.

11. A microgrid network controller of a microgrid network comprising a first microgrid, and a second microgrid, the microgrid network controller comprising:
processing circuitry; and
storage storing instructions executable by the processing circuitry, wherein the instructions when executed by the processing circuitry cause the microgrid network controller to:
determine a first voltage range and a first frequency range for operating the first microgrid that is operating at a first voltage and a first frequency;
determine a second voltage range and a second frequency range for operating the second microgrid that is operating at a second voltage and a second frequency;
determine an overlapping voltage range included within both the first voltage range of the first microgrid and the second voltage range of the second microgrid;
determine an overlapping frequency range included, within both the first frequency range of the first microgrid and the second frequency range of the second microgrid;
select a third voltage within the overlapping voltage range;
select a third frequency within the overlapping frequency range;
control the first microgrid to change from the first voltage and the first frequency to the third voltage and the third frequency;
control the second microgrid to change from the second voltage and the second frequency to the third voltage and the third frequency; and
connect the first microgrid with the second microgrid by closing a switch connecting the first microgrid to the second microgrid.

12. The microgrid network controller of claim 11, wherein the instructions when executed by the processing circuitry further cause the microgrid network controller to determine the overlapping voltage range based on power requirements of critical loads in the first microgrid and the second microgrid.

13. The microgrid network controller of claim 11, wherein the determining of the overlapping voltage range is based on an estimated operating voltage of the first microgrid and the second microgrid after the switch has been closed and the first microgrid is connected to the second microgrid.

14. The microgrid network controller of claim 11, wherein the determining of the overlapping voltage range is based on an estimated steady-state power flow direction over the switch after the switch has been closed and the first microgrid is connected to the second microgrid.

15. The microgrid network controller of claim 11, wherein the determining of the overlapping voltage range is based on stability of control loops within a control system of the microgrids.

16. The microgrid network controller of claim 11, wherein the determining of the overlapping frequency range is based on power requirements of critical loads in the first microgrid and/or the second microgrid.

17. The microgrid network controller of claim 11, wherein the determining of the overlapping frequency range is based on an estimated operating frequency of the first microgrid and the second microgrid after the switch has been closed and the first microgrid is connected to the second microgrid.

18. The method of claim 1, wherein the determining of the overlapping voltage range and determining of the overlapping frequency range is based on power requirements of critical loads in the first microgrid.

19. A computer program product comprising:
computer-executable components for causing a microgrid network controller to synchronize a first microgrid operating at a first voltage and a first frequency with a second microgrid operating a second voltage and a second frequency when the computer-executable components are executed on processing circuitry of the microgrid network controller by causing the microgrid network controller to:
determine a first voltage range and a first frequency range for the first microgrid;
determine a second voltage range and a second frequency range for the second microgrid;
determine an overlapping voltage range included within both the first voltage range of the first microgrid and the second voltage range of the second microgrid;
determine an overlapping frequency range included within both the first frequency range of the first microgrid and the second frequency range of the second microgrid;
select a third voltage within the overlapping voltage range;
select a third frequency within the overlapping frequency range;
control the first microgrid to change from the first voltage and the first frequency to the third voltage and the third frequency;
control the second microgrid to change from the second voltage and the second frequency to the third voltage and the third frequency; and
connect the first microgrid with the second microgrid by closing a switch connecting the first microgrid to the second microgrid.

20. The microgrid network controller of claim 11, wherein the determining of the overlapping voltage range and determining of the overlapping frequency range is based on power requirements of critical loads in the first microgrid.

* * * * *